(12) United States Patent
Huang et al.

(10) Patent No.: US 12,534,598 B2
(45) Date of Patent: Jan. 27, 2026

(54) RUBBER REINFORCING FILLER AND ITS PREPARATION METHOD BY ACTIVATION AND MODIFICATION OF COAL GANGUE

(71) Applicant: Taiyuan University of Technology, Taiyuan (CN)

(72) Inventors: Wei Huang, Taiyuan (CN); Kai Yang, Taiyuan (CN); Qian Zhang, Taiyuan (CN); Jianwei Liu, Taiyuan (CN); Zenglin Gao, Taiyuan (CN); Zeguang Hao, Taiyuan (CN)

(73) Assignee: Taiyuan University of Technology, Taiyuan (CN)

(*) Notice: Subject to any disclaimer, the term of this patent is extended or adjusted under 35 U.S.C. 154(b) by 608 days.

(21) Appl. No.: 17/985,179

(22) Filed: Nov. 11, 2022

(65) Prior Publication Data

US 2023/0151188 A1 May 18, 2023

(30) Foreign Application Priority Data

Nov. 16, 2021 (CN) .......................... 202111356153.6

(51) Int. Cl.
*C08K 11/00* (2006.01)
*C08F 36/08* (2006.01)
(Continued)

(52) U.S. Cl.
CPC ............ *C08K 11/005* (2013.01); *C08F 36/08* (2013.01); *C08K 3/36* (2013.01); *C08K 9/04* (2013.01); *C08K 2201/005* (2013.01)

(58) Field of Classification Search
CPC .......... C08K 11/005; C08K 3/36; C08K 9/04; C08K 2201/005; C08K 9/02; C08K 9/06;
(Continued)

(56) References Cited

U.S. PATENT DOCUMENTS

2010/0098495 A1* 4/2010 Shi .................. C08K 3/346
405/128.8

FOREIGN PATENT DOCUMENTS

| CN | 102977641 A | * | 3/2013 | |
|----|----|----|----|----|
| CN | 104177714 A | * | 12/2014 | .............. C08L 23/16 |
| JP | 2018022681 A | * | 2/2018 | |

OTHER PUBLICATIONS

Zhang, CN102977641-MT (Year: 2013).*
Kotaro, JP2018022681-MT (Year: 2018).*
Wu, CN104177714-MT (Year: 2014).*

* cited by examiner

*Primary Examiner* — Mark Eashoo
*Assistant Examiner* — Zhen Liu
(74) *Attorney, Agent, or Firm* — Addison D. Ault; IPGentleman Intellectual Property Services, LLC

(57) ABSTRACT

A rubber reinforcing filler and a method for preparing rubber reinforcing filler by activation and modification of coal gangue are provided. The method includes the following steps: providing coal gangue raw material; crushing coal gangue raw materials; the crushed coal gangue raw materials are ultrafine grinding to obtain coal gangue particles; coal gangue particles were obtained by air flow classification. Activation of coal gangue particles; the activated gangue particles were surface modified and ground to obtain the modified gangue particles. The invention relates to the field of comprehensive utilization of coal gangue and the technical field of rubber filler. The method is simple and effective, which can complete the blending modification of coupling agent and activated coal gangue particles for surface modification at low cost, so as to avoid the waste of materials in the traditional modification process and realize the preparation of high quality rubber reinforcing filler.

7 Claims, 4 Drawing Sheets

(51) Int. Cl.
*C08K 3/36* (2006.01)
*C08K 9/04* (2006.01)

(58) Field of Classification Search
CPC . C08K 3/346; C08K 2003/2237; C08F 36/08; C09C 1/44; C09C 1/405; C09C 3/006; C09C 3/041; C09C 3/043; C09C 3/08; C09C 3/12; C01P 2004/03; C01P 2004/61; C01P 2006/21; C01P 2006/90
See application file for complete search history.

RUBBER REINFORCING FILLER AND ITS PREPARATION METHOD BY ACTIVATION AND MODIFICATION OF COAL GANGUE

CROSS REFERENCE TO THE RELATED APPLICATIONS

This application is based upon and claims priority to Chinese Patent Application No. 202111356153.6, filed on Nov. 16, 2021, the entire contents of which are incorporated herein by reference.

TECHNICAL FIELD

The invention relates to the field of comprehensive utilization of coal gangue and the technical field of rubber filler, in particular to a method for preparing rubber reinforcing filler by activation and modification of coal gangue and the obtained rubber reinforcing filler.

BACKGROUND

Natural rubber has large elasticity and high tensile strength, but is prone to aging and deterioration, acid and alkali corrosion resistance, poor thermal stability, and the raw material is expensive, so it is necessary to add fillers to improve its modulus, hardness and wear resistance according to specific products in production. The surface of reinforcing filler particles has strong chemical activity, and when combined with rubber molecules, it can effectively improve the strength of rubber products, so that it has good wear resistance, tear resistance, heat resistance, cold resistance, oil resistance and other properties. And it can prolong the service life of products, such as carbon black, white carbon black, silicate, carbonate and so on. Rubber reinforcing filler combines the advantages of rubber filling and reinforcing agent, that is, taking filler as raw material, through mechanical processing and chemical modification, the material obtained is close to the reinforcing agent in terms of physical performance and use effect, while the cost is between the above two.

Carbon black is the most important reinforcing filler for rubber products, and its particle size is in nanometer level. It is mainly made of natural gas, coke gas or to gasify heavy oil, coal tar and other hydrocarbon raw materials in the absence of oxygen (air isolation) under the condition of flame pyrolysis. The price of traditional black carbon has remained high because of tight crude oil supplies, rising raw material prices, complex production processes, and strict state controls on production, along with severe pollution. Therefore, it is realistic to develop a new type of rubber filling material with low cost, high performance and no pollution as a substitute for traditional carbon black.

The composition of coal gangue has a layered structure similar to carbon black. The structural unit is a silicon oxygen tetrahedron, and the structural unit is connected to each other into an octahedron. the surface is rich in oxygen and hydroxyl active sites, easy to cross link with the polymer molecules. Therefore, it has the similar function of carbon black and white carbon black filler, and can be used as reinforcing filling aggregate. $SiO_2$ can increase the strength of rubber, $Al_2O_3$ plays an incremental role, CaO plays a reinforcing role, and the role of carbon and carbon black added to rubber is similar. However, the hydroxyl group interaction on the surface of gangue produces hydrogen bond, which is easy to produce agglomeration, and its compatibility with rubber is poor, which has a bad impact on the processing performance of filled rubber and the usability of products.

The problem of poor compatibility between powder particles and rubber can be solved by chemical modification of coupling agent. There are two kinds of coupling agent modification on rubber filler surface: dry method and wet method. Dry modification is to modify the modifier directly or with a certain concentration of diluent, and then added to the powder for modification under the conditions of heating or high pressure. Wet modification is to blend powder with a certain solvent to make slurry, and then put the modifier into the slurry and modify the powder under heating or high pressure process. However, in the current modification methods, the waste of modifier is serious and the modification conditions are demanding, so it is our research goal to find a more concise and effective method.

At present, the accumulated coal gangue in China is about 7 billion tons, occupying more than 12,000 hectares of land, accounting for about 40 percent of the country's industrial solid waste discharge. The massive accumulation of coal gangue causes a series of problems such as land occupation, environment pollution, landscape destruction and so on. The use of coal gangue to prepare high value-added rubber filler to replace carbon black has many advantages, such as reducing the amount of carbon black, protecting the environment and recycling solid wastes.

SUMMARY

In order to solve at least one of the above problems and defects in the prior art, the present invention provides a method for preparing rubber reinforcing filler by activation and modification of coal gangue and the rubber reinforcing filler. One of the purposes of the invention is to develop a method for preparing rubber reinforcing filler by activation and modification of coal gangue, so as to realize high value utilization of coal gangue.

According to one aspect of the invention, a method for preparing rubber reinforcing filler by activation and modification of coal gangue is provided, including the following steps:

providing coal gangue raw materials;

crushing coal gangue raw materials; the coal gangue raw material is crushed to the particle size of 2 mm;

the crushed coal gangue raw materials are ultrafine grinding to obtain coal gangue particles; the particle size of the coal gangue particles is less than 50 microns;

the coal gangue particles were obtained by air flow classification; air flow classification of coal gangue particles includes drying coal gangue particles to water content less than 0.5%, and sorting coal gangue particles with particle size less than 10 microns through air flow classifier. For coal gangue particles equal to or greater than 10 microns, ultrafine grinding is repeated to make them all become coal gangue particles with particle size less than 10 microns;

activation of coal gangue particles; the calcination and activation of coal gangue particles is carried out in a high temperature calciner. The calcination temperature is 500° C.-900° C. and the calcination time is 0.1 hours-10 hours under air atmosphere; or pyrolytic activation can be carried out in an inert atmosphere (such as nitrogen, argon, or helium atmosphere) in a pyrolytic furnace. The pyrolysis temperature is 500° C.-1200° C. and the pyrolysis time is 0.1 hours-48 hours;

the activated gangue particles were surface modified and ground to obtain the modified gangue particles;

the amount of modifier used for surface modification is 0.5%-5%;

the modifier includes a solid coupling modifier, which includes any one of aluminate coupling agents, sodium dodecyl benzene sulfonate, zirconium aluminate coupling agents or any combination thereof. Where, the modifier and activated coal gangue particles are stirred and mixed, and placed in the grinding machine for 20 minutes-60 minutes;

or the modifier includes a liquid modifier, which includes silane coupling agents, titanate coupling agents, borate coupling agents, stearic acid, surfactant or any combination thereof; and the ratio of the liquid modifier and ethanol is (0.1-1.4):1 to form the modifier solution.

The ultrasonic atomization device is used to spray in the form of fog in the calcined activated coal gangue particles stirred, and grind them in a ball mill for 20 minutes-60 minutes.

In some embodiments, the provision of coal gangue raw material includes the removal of debris from waste coal gangue piles to obtain coal gangue raw material.

In some embodiments, the coal gangue material is broken up using the (jaw type) crusher.

In some embodiments, the wetting contact angle of the gangue particles after surface modification is 150°-175°, and the gangue particles obtained after surface modification and grinding are used as rubber reinforcing filler.

According to another aspect of the invention, a rubber reinforcing filler is provided, where the rubber reinforcing filler is the coal gangue particles obtained above.

The method of the invention and the rubber reinforcing filler obtained thereby can achieve at least some of the following advantages:

The method of the invention is a simple and effective activation method, which can complete the blending of coupling agent and activated coal gangue at a low cost, as well as the dry grinding modification of coal gangue, and avoid the waste of materials in the traditional modification process;

The other advantage is that the particle size is less than 10 μm by air flow classification. The modified agent is mixed evenly with activated coal gangue by ultrasonic atomization device, and the modification process is completed by dry modification of grinding machine. The whole process is simple to operate and the modification effect is excellent. After treatment, the filler particles are smaller, the shape is regular and uniform, the surface hydrophobicity is greatly improved, and the binding ability with rubber is enhanced. It can effectively improve the wear resistance, compressive tensile strength, toughness and other mechanical properties of rubber, and improve the high value utilization rate of coal gangue.

BRIEF DESCRIPTION OF THE DRAWINGS

These and/or other aspects and advantages of the invention will become apparent and easy to understand from the following description of preferred embodiments in conjunction with the attached drawings, where.

DETAILED DESCRIPTION OF THE EMBODIMENTS

Figure 1:
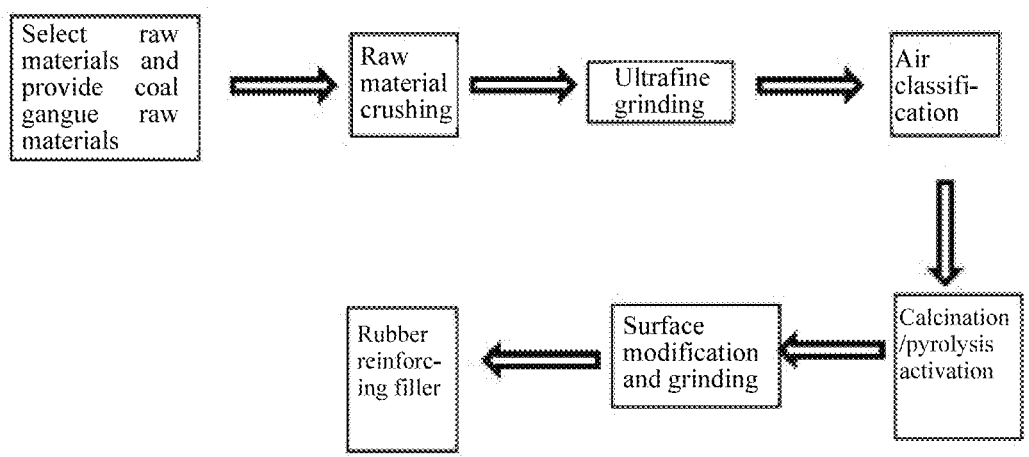
FIG. 1 is a flow chart of a method of preparing rubber reinforcing filler by activation and modification of coal gangue in an embodiment of the present invention.

In the following, the technical solution of the invention is further explained in detail through embodiments and combined with the attached drawings. In the specification, the same or similar attached drawing labels indicate the same or similar parts. The following description of the embodiment of the invention with reference to the attached drawings is intended to explain the general idea of the invention and should not be construed as a limitation of the invention.

In one embodiment of the invention, a method for preparing rubber reinforcing filler by activation and modification of coal gangue is provided. The raw materials used are coal gangue, and can also be the ash after power generation from coal gangue. The process is simple and the effect is excellent. The particle size is greatly reduced by ultrafine grinding process, and then it can be used for rubber filling particle size by air flow grading screening. After proportioning, the coupling agent and coal gangue are mixed and ground in the process of ball milling by dry modification. When the particle size of coal gangue decreases and the specific surface area increases, the modifier is evenly dispersed and chemically reacts with the surface groups of coal gangue to cover the surface of coal gangue. The modified coal gangue shows good hydrophobicity and can be used as reinforcing filler instead of carbon black/white carbon black for rubber filling.

The method of preparing rubber reinforcing filler by activation and modification of coal gangue includes the following steps:

providing coal gangue raw materials;

crushing coal gangue raw materials;

the crushed coal gangue raw materials are ultrafine grinding to obtain coal gangue particles;

the coal gangue particles were obtained by air flow classification;

activation of coal gangue particles; and the activated gangue particles were surface modified and ground to obtain the modified gangue particles.

Further, the provision of coal gangue raw materials includes the removal of grass roots, leaves and other debris from waste coal gangue piles such as those accumulated in coal mines to obtain coal gangue raw materials.

In one example, raw coal gangue was broken to a uniform particle size of approximately 2 mm using an example of the jaw crusher;

The particle size of the coal gangue particles is less than 50 microns.

Air flow classification of coal gangue particles includes drying coal gangue particles to water content less than 0.5%, and sorting coal gangue particles with particle size less than 10 microns through air flow classifier. For coal gangue particles equal to or greater than 10 microns, ultrafine grinding is repeated to make them all become coal gangue particles with particle size less than 10 microns.

In an example, the calcination and activation of coal gangue particles is carried out in a high temperature calciner. The calcination temperature is 500° C.-900° C., such as 820° C., 900° C., and the calcination time is 0.1 hours-10 hours, such as 2 hours, 5 hours, and 8 hours.

Alternatively, pyrolytic activation can be carried out in an inert atmosphere in a pyrolytic furnace, such as nitrogen or argon, or a reducing gas, such as hydrogen or carbon monoxide. The pyrolysis temperature is 500° C.-1200° C. (e.g. 600° C., 800° C., 900° C. or 1000° C.), and the pyrolysis time is 0.1 hours-48 hours (e.g. 1 hour, 3 hours, 12 hours, 24 hours, 36 hours).

In some embodiments of the present invention, the amount of modifier used for surface modification is 0.5%-5%.

The modifier is a solid modifier, which includes any one of aluminate coupling agents, sodium dodecyl benzene sulfonate, zirconium aluminate coupling agents, etc. or any combination thereof.

Where, the modifier and coal gangue particles are stirred and mixed, and placed in the grinding machine (ball mill) for a predetermined time (20 minutes-60 minutes (min), such as ball mill 20 min, 30 min).

The modifier may also be a liquid modifier, which includes silane coupling agents, phthalate coupling agents, borate coupling agents, stearic acid, surfactant, etc. or any combination thereof.

The ratio of the modifier and ethanol is (0.1-1.4):1 (e.g. 0.8:1 or 1.2:1) to form the modifier solution. The (ultrasonic) atomization device is used to spray in the form of fog (e.g. at room temperature −60° C., e.g. 20° C.) in the calcined activated coal gangue particles stirred (e.g. mechanically uniform), and (e.g. ball milling in a ball mill for 20 min-60 min (e.g. 20 min, 30 min, 40 min)) for grinding.

The wetting contact angle of the gangue particles after surface modification is 150°-175° (such as 157°, 165.2°, 167.2°, 168.2°, 170.2°), and the gangue particles obtained after surface modification and grinding are used as rubber reinforcing filler.

The rubber reinforcing filler is a coal gangue particle prepared according to the method.

As mentioned above, this method has simple process and excellent effect. Coal gangue particles with particle size less than 10 μm can be separated by crushing and drying into the air stream, and then modified by pyrolysis and activation under calcination or inert atmosphere. As for the liquid modifier, the liquid modifier is sprayed directly into activated coal gangue by ultrasonic atomizing device and grinded and mixed evenly. For solid modification agent, it is mixed and ground with coal gangue ash and slag. The modified coal gangue ash shows good hydrophobicity and can be used as reinforcing filler to partially or completely replace carbon black/white carbon black for rubber filling.

In the current study, it is found that solid modifiers can be mixed with coal gangue for blending and grinding, but liquid modifiers will inevitably accumulate in the process of adding due to their own characteristics and cannot be dispersed evenly. The inventor of the invention finds that the liquid modifier is mutually soluble with ethanol to form a solution, and the traditional method can alleviate the liquid aggregation in the stirring process, but the modification effect is poor. The invention adopts ultrasonic atomization, and the mixed liquid is atomized by controlling the current to generate ultrasonic wave, which is evenly dispersed in the coal gangue particles stirred at a uniform speed, so as to minimize the agglomeration phenomenon caused by the addition of liquid droplets.

The method and steps of the invention are specified as follows through examples:

Example 1

See FIG. 1. (1) Selecting and providing coal gangue raw materials: waste coal gangue piles accumulated in coal mines, and remove sundries such as grass roots and leaves.

(2) Crushing of coal gangue raw material: the jaw crusher is used to achieve uniform particle size of about 2 mm.

(3) Ultrafine grinding: the particles obtained in step (2) were ultrafine ground to a particle size less than 50 μm.

(4) Airflow classification: dry until the water content is less than 0.5%. After the airflow classifier, the particle size is less than 10 μm. If the particle size is too large, repeat step (3) until the particle size meets the requirements.

(5) Calcination and activation: carried out in high temperature calcination furnace. Calcination temperature: 820° C.; calcination time: 2 hours (h).

(6) Surface modification and grinding: the dosage of aluminate coupling agent is 1%, 2%, 3% (hereinafter referred to as example 1-1, example 1-2, example 1-3). The mixture is weighed and stirred according to the ratio. The activated coal gangue ash and coupling agent with the above good ratio are placed in the ball mill, and the ball milling time is set to 20 min.

(7) The collected modified coal gangue is the rubber reinforcing filler.

Figure 3A:
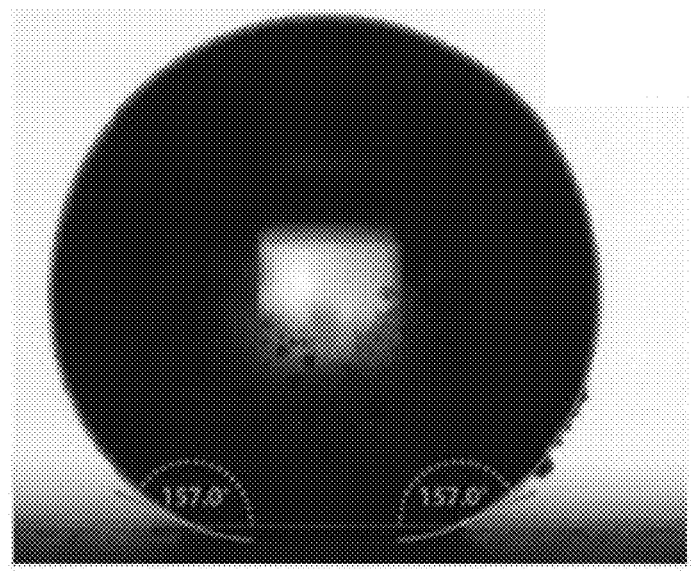
FIG. 3A is the contact angle detection diagram of gangue particles in example 1-1 after ball milling modification according to the method of the invention.
Figure 3B:
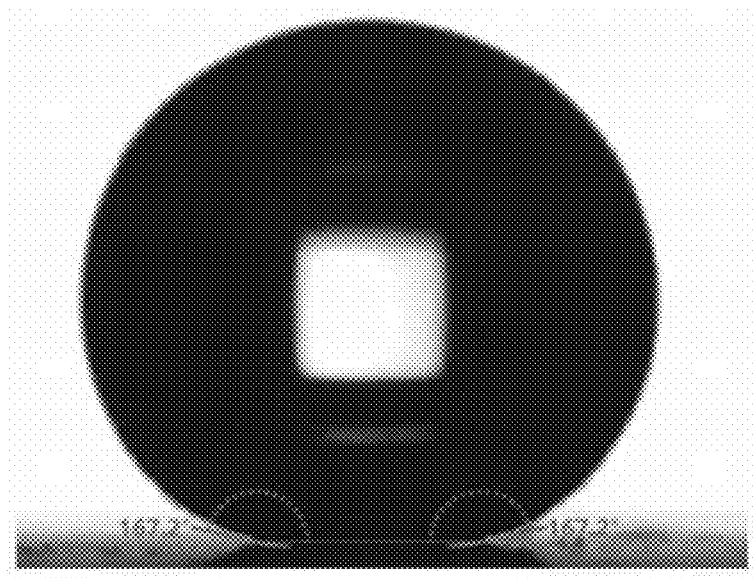
FIG. 3B is the contact angle detection diagram of gangue particles in example 1-2 after ball milling modification according to the method of the invention.
Figure 3C:
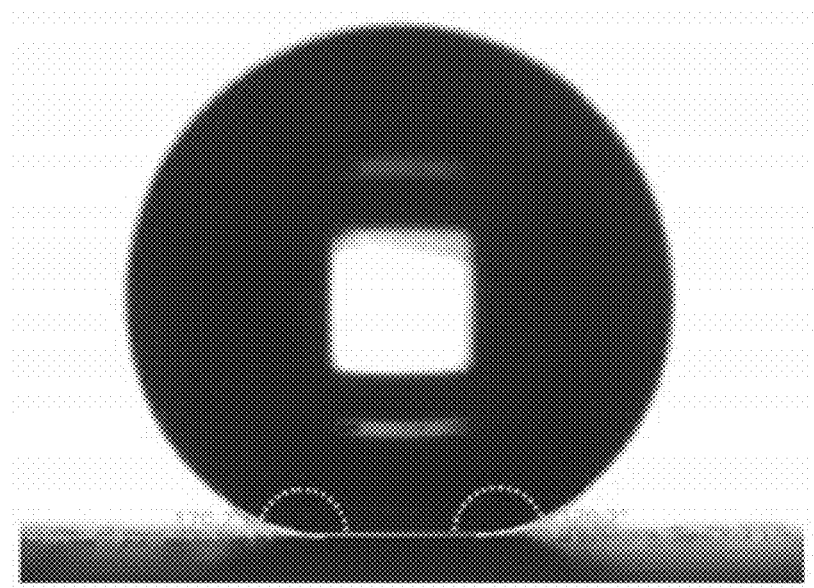
FIG. 3C is the contact angle detection diagram of gangue particles in examples 1-3 after ball milling modification according to the method of the invention.

(8) After the modification by ball milling, the shape of the filler is regular and uniform, the particle size is small, and the surface hydrophobicity is improved. According to the addition amount of aluminate coupling agent is 1%, 2% and 3%, the wetting contact angle can reach 157° (see FIG. 3A), 167° (see FIG. 3B) and 170° (see FIG. 3C) respectively. The binding ability with rubber is strengthened. According to the rubber performance measurement data in Table 1, it can be seen that the modified coal gangue ash residue filling rubber can effectively improve the wear resistance, compressive tensile strength, toughness and other mechanical properties of rubber.

Example 2

See FIG. 1. (1) Selecting and providing coal gangue raw materials: waste coal gangue piles accumulated in coal mines, and remove sundries such as grass roots and leaves.

(2) Crushing of coal gangue raw material: the jaw crusher is used to achieve uniform particle size of about 2 mm.

(3) Ultrafine grinding: the particles obtained in step (2) were ultrafine ground to a particle size less than 50 μm.

(4) Airflow classification: dry until the water content is less than 0.5%. After the airflow classifier, the particle size is less than 10 μm. If the particle size is too large, repeat step (3) until the particle size meets the requirements.

(5) Calcination and activation: carried out in high temperature calcination furnace. Calcination temperature: 820° C.; calcination time: 2 h.

(6) Surface modification and grinding: The amount of coupling agent added was 1%. Firstly, the silane coupling agent: ethanol was mixed into 0.8:1 solution, and then sprayed evenly into activated coal gangue stirred by mechanical uniform speed by ultrasonic atomization device at 20° C. The activated coal gangue ash and coupling agent with the above good ratio are placed in the ball mill, and the ball milling time is set to 30 min.

(7) The collected modified coal gangue is the rubber reinforcing filler.

Figure 4:
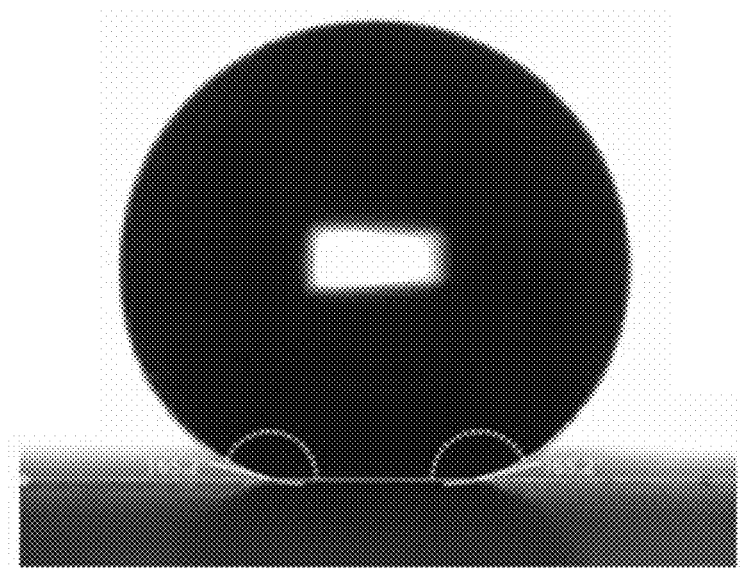
FIG. 4 is the contact angle detection diagram of the gangue particles in example 2 after ball milling modification according to the method of the invention.

(8) After the modification by ball milling, the shape of the filler is regular and uniform, the particle size is small, and the surface hydrophobicity is improved. The wetting contact angle reached 165.2° (see FIG. 4), and the binding ability with rubber was strengthened. According to the rubber performance measurement data in Table 1, it can be seen that the modified coal gangue ash residue filling rubber can effectively improve the wear resistance, compressive tensile strength, toughness and other mechanical properties of rubber.

Example 3

See FIG. 1. (1) Selecting and providing coal gangue raw materials: waste coal gangue piles accumulated in coal mines, and remove sundries such as grass roots and leaves.

(2) Crushing of coal gangue raw material: the jaw crusher is used to achieve uniform particle size of about 2 mm.

(3) Ultrafine grinding: the particles obtained in step (2) were ultrafine ground to a particle size less than 50 μm.

(4) Airflow classification: dry until the water content is less than 0.5%. After the airflow classifier, the particle size is less than 10 μm. If the particle size is too large, repeat step (3).

(5) Pyrolysis activation: the inert atmosphere pyrolysis activation is carried out in the pyrolysis furnace. The pyrolysis activation is carried out in the atmosphere of nitrogen, argon or reducing gases such as H2 and CO. The pyrolysis temperature is 900° C. and the pyrolysis time is 3 h.

(6) Surface modification and grinding: the amount of titanate coupling agent added was 1%. Firstly, the titanate coupling agent: ethanol was mixed into 1.2:1 solution, and then sprayed evenly into activated coal gangue stirred by mechanical uniform speed by ultrasonic atomization device at 30° C. The activated coal gangue ash and coupling agent with the above good ratio are placed in the ball mill, and the ball milling time is set to 30 min.

(7) The collected modified coal gangue is the rubber reinforcing filler.

Figure 5:
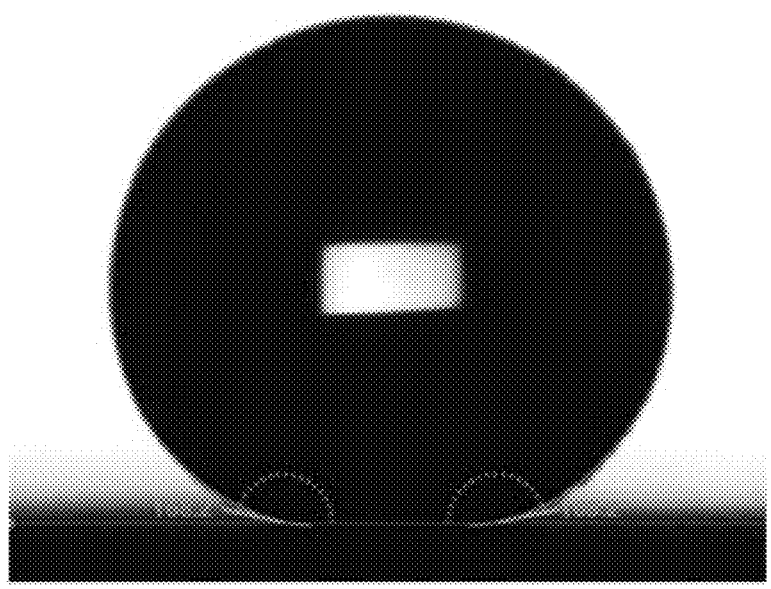
FIG. 5 is the contact angle detection diagram of the gangue particles in example 3 after ball milling modification according to the method of the invention.

(8) After the modification by ball milling, the shape of the filler is regular and uniform, the particle size is small, and the surface hydrophobicity is improved. The wetting contact angle reached 168.2° (see FIG. 5), and the binding ability with rubber was strengthened. According to the rubber performance measurement data in Table 1, it can be seen that the modified coal gangue ash residue filling rubber can effectively improve the wear resistance, compressive tensile strength, toughness and other mechanical properties of rubber.

Comparative Example

Figure 2:
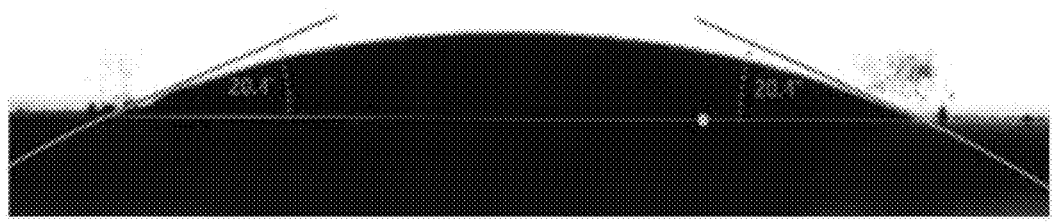
FIG. 2 is the initial wetting contact angle detection diagram of unmodified gangue particles.

As shown in FIG. 2, the wetting contact angle of unmodified activated gangue particles with particle size less than 10 μm was tested, and the initial wetting contact angle was only 20.4°. Then it is used to fill rubber and its properties are shown in Table 1. In FIG. 2, the contact angle measurement is in the process of dynamic change, and finally the water droplets are absorbed by the coal gangue ash and slag powder, with an average contact angle of about 10°.

TABLE 1

Performance test of rubber filled with different coal gangue particles

| Performance index | Tear strength (Mpa) | Tensile strength (Mpa) | Tensile yield (%) | Permanent deformation (%) |
|---|---|---|---|---|
| Blank example | 22.34 | 16.99 | 895.4 | 22.2 |
| Example 1-1 | 43.04 | 21.76 | 630.2 | 18.9 |
| Example 1-2 | 43.16 | 23.84 | 642.8 | 19.6 |
| Example 1-3 | 45.19 | 22.39 | 660.6 | 20.8 |
| Example 2 | 43.44 | 21.39 | 680.2 | 18.5 |
| Example 3 | 44.58 | 22.95 | 677.5 | 20.9 |
| HG6-407-79 | ≥19.8 | ≥8 | ≥500 | ≤55 |

It should be noted that in the attached drawing of the present invention, the wetting contact angle less than 90° is hydrophilic, and the wetting contact angle more than 90° is hydrophobic. The larger the angle, the better the hydrophobicity effect after modification.

It can be seen from the above that the measurement results of wet contact Angle of the modified gangue in examples 1-3 meet the requirements of rubber filling, and the modified coal gangue ash can effectively improve the wear resistance, compressive tensile strength, toughness and other mechanical properties of rubber. Coal gangue ash can replace or partially replace carbon black/white carbon black as rubber reinforcing filler.

Although some embodiments of the disclosed general idea have been shown and illustrated, ordinary technicians in the field will understand that they may be changed without departing from the principles and spirit of the disclosed general idea, and that the scope of the invention is defined by claims and their equivalents.

What is claimed is:

1. A method for preparing a rubber reinforcing filler by an activation and a modification of a coal gangue, comprising following steps:

providing coal gangue raw materials;

crushing the coal gangue raw materials; wherein the coal gangue raw materials are crushed to crushed coal gangue raw materials with a particle size of 2 mm;

ultrafine grinding the crushed coal gangue raw materials to obtain coal gangue particles, wherein a particle size of the coal gangue particles is less than 50 microns;

performing an air flow classification of the coal gangue particles; wherein steps of performing the air flow classification comprises: drying the coal gangue particles to a water content less than 0.5%, and sorting the coal gangue particles with a particle size less than 10 microns through an air flow classifier; wherein for the coal gangue particles equal to or greater than 10 microns, the ultrafine grinding is repeated to make the coal gangue particles equal to or greater than 10 microns all become the coal gangue particles with the particle size less than 10 microns;

activating the coal gangue particles to obtain activated coal gangue particles; wherein steps of activating the coal gangue particles comprises: carrying out an calcination and an activation of the coal gangue particles in high temperature calciner, wherein a calcination temperature is 500° C. . . . 900° C., and a calcination time is 0.1 hours-10 hours under an air atmosphere; or carrying out a pyrolytic activation of the coal gangue particles in an inert atmosphere in a pyrolytic furnace, wherein a pyrolysis temperature is 500° C. . . . 1200° C., and a pyrolysis time is 0.1 hours-48 hours, and the inert atmosphere is a nitrogen atmosphere, an argon atmosphere, or a helium atmosphere;

performing a surface modification and a grinding on the activated coal gangue particles to obtain modified gangue particles; wherein an amount of a modifier used for the surface modification is 0.5%-5%;

the modifier comprises a solid coupling modifier, wherein the solid coupling modifier comprises one of aluminate coupling agents, sodium dodecyl benzene sulfonate, zirconium aluminate coupling agents, or any combination of the aluminate coupling agents, the sodium dodecyl benzene sulfonate, and the zirconium aluminate coupling agents; and wherein the modifier and the activated coal gangue particles are stirred, mixed, and placed in a grinding machine for 20 minutes-60 minutes;

or the modifier comprises a liquid modifier, wherein the liquid modifier comprises silane coupling agents, titanate coupling agents, borate coupling agents, stearic acid, a surfactant, or any combination of the silane coupling agents, the titanate coupling agents, the borate coupling agents, the stearic acid, and the surfactant; wherein a ratio of the liquid modifier and ethanol is (0.1-1.4):1 to form a modifier solution; and wherein an ultrasonic atomization device is used to spray in a form of a fog in a calcined activated coal gangue particles stirred, and the calcined activated coal gangue particles are ground in a ball mill for 20 minutes-60 minutes.

2. The method according to claim 1, wherein a provision of the coal gangue raw materials comprises a removal of a debris from wasted coal gangue piles to obtain the coal gangue raw materials.

3. The method according to claim 1, wherein the coal gangue raw materials are broken up by using a crusher.

4. The method according to claim 1, wherein a wetting contact angle of the modified gangue particles is 150°-175°, and the modified gangue particles obtained after the surface modification and the grinding are used as the rubber reinforcing filler.

5. A rubber reinforcing filler, wherein the rubber reinforcing filler is the modified gangue particles obtained by the method according to claim 4.

6. The method according to claim 2, wherein a wetting contact angle of the modified gangue particles is 150°-175°, and the modified gangue particles obtained after the surface modification and the grinding are used as the rubber reinforcing filler.

7. The method according to claim 3, wherein a wetting contact angle of the modified gangue particles is 150°-175°, and the modified gangue particles obtained after the surface modification and the grinding are used as the rubber reinforcing filler.

* * * * *